Sept. 4, 1962 L. S. WILLIAMS 3,052,404
CHART READING MECHANISM
Filed June 17, 1957 7 Sheets-Sheet 1
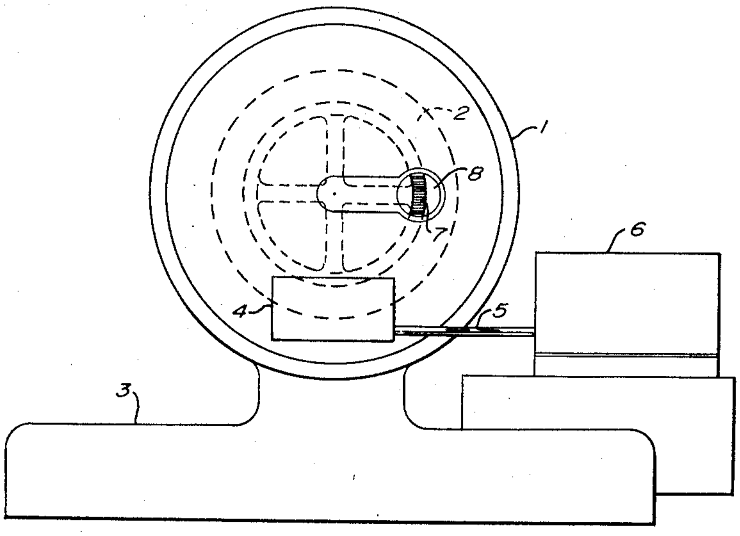
Fig. I
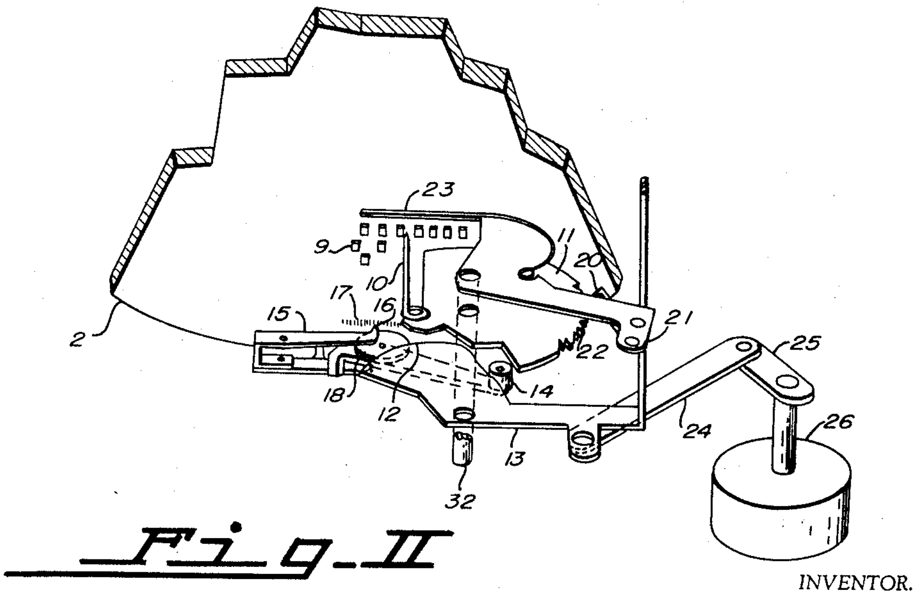
Fig. II
INVENTOR.
LAWRENCE S. WILLIAMS
BY
Marshall, Marshall & Yeasting
ATTORNEYS CHART READING MECHANISM
Filed June 17, 1957
7 Sheets-Sheet 2
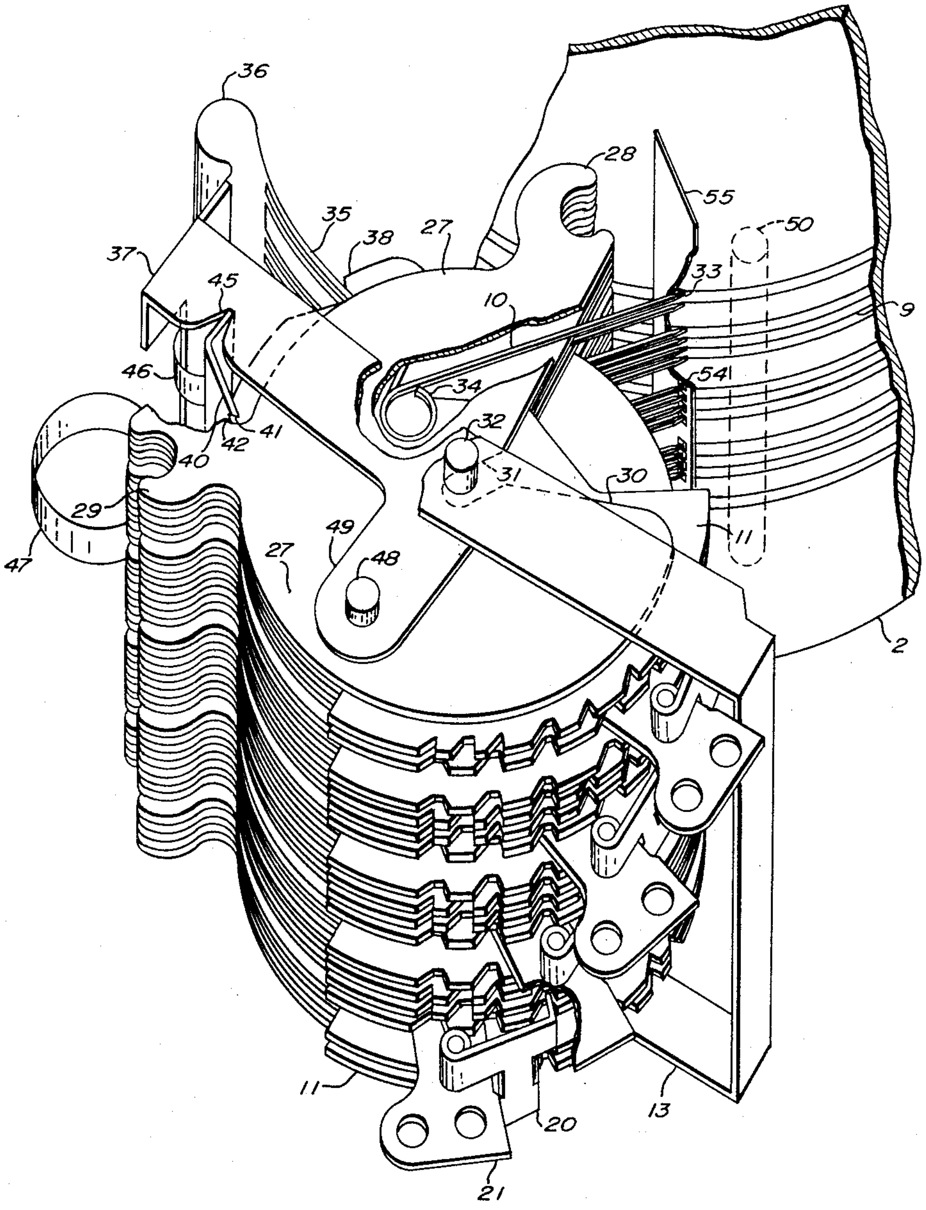
Fig. III
INVENTOR.
LAWRENCE S. WILLIAMS
BY
Marshall, Marshall & Yeasting
ATTORNEYS Sept. 4, 1962 L. S. WILLIAMS 3,052,404
CHART READING MECHANISM
Filed June 17, 1957 7 Sheets-Sheet 3
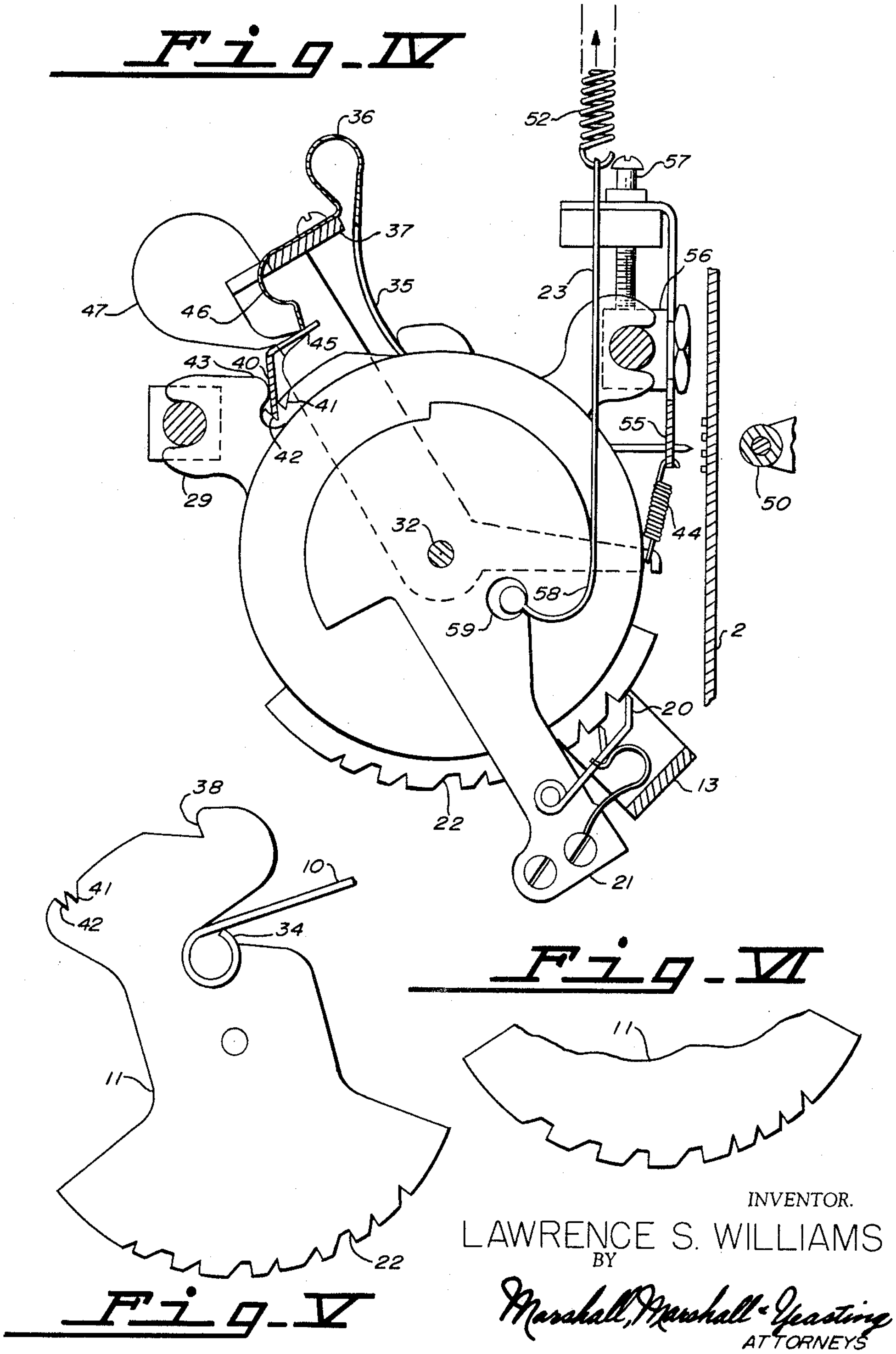
Fig. IV, Fig. V, Fig. VI
INVENTOR.
LAWRENCE S. WILLIAMS
BY
Marshall, Marshall & Yeasting
ATTORNEYS

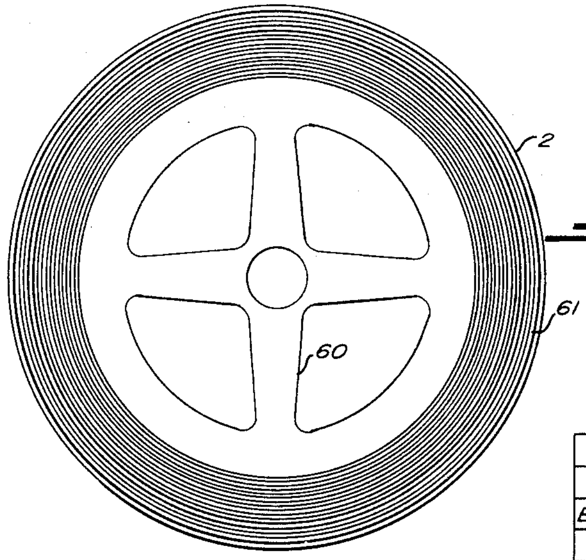
Fig. VII
| CODE | | | | |
|---|---|---|---|---|
| | A | B | C | D |
| BLANK | | | | D |
| 0 | A | | | D |
| 1 | A | | | |
| 2 | | | C | |
| 3 | | B | | D |
| 4 | A | | C | D |
| 5 | A | B | | |
| 6 | | | C | D |
| 7 | A | B | | D |
| 8 | A | | C | |
| 9 | | B | | |
Fig. XI
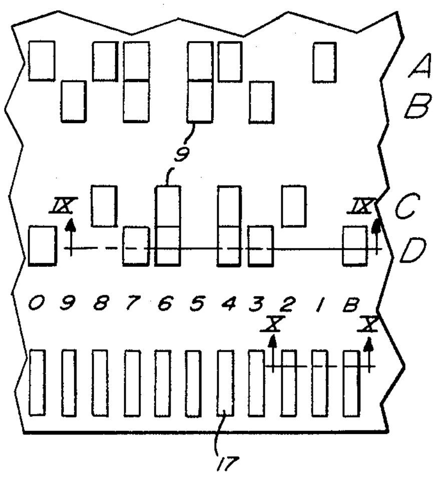
Fig. VIII
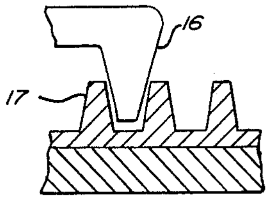
Fig. X
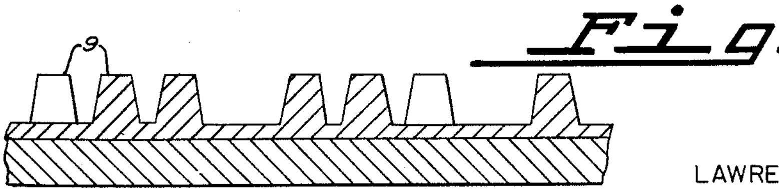
Fig. IX
INVENTOR.
LAWRENCE S. WILLIAMS
BY
Marshall, Marshall & Yeasting
ATTORNEYS Sept. 4, 1962 L. S. WILLIAMS 3,052,404
CHART READING MECHANISM
Filed June 17, 1957 7 Sheets-Sheet 5
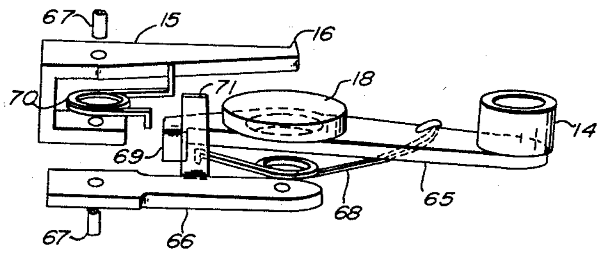
Fig. XII
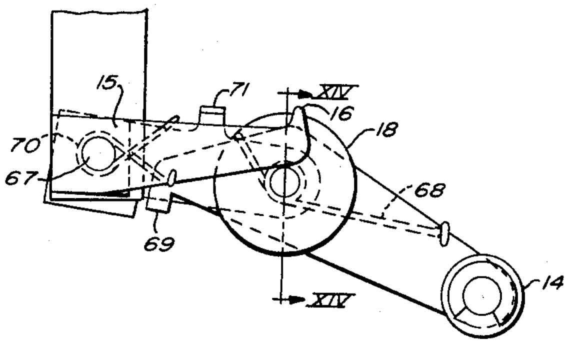
Fig. XIII
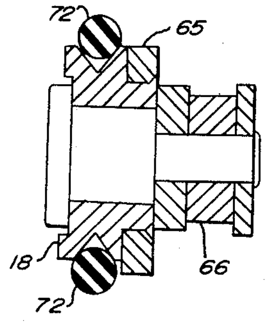
Fig. XIV
INVENTOR.
LAWRENCE S. WILLIAMS
BY
Marshall, Marshall & Yeasting
ATTORNEYS Sept. 4, 1962 L. S. WILLIAMS 3,052,404
CHART READING MECHANISM
Filed June 17, 1957 7 Sheets-Sheet 6
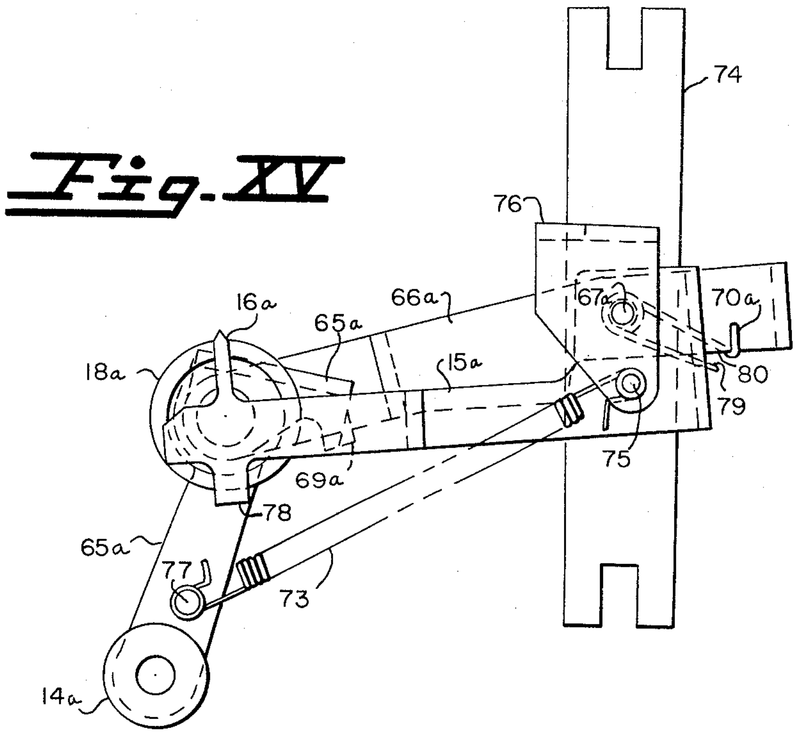
Fig. XV
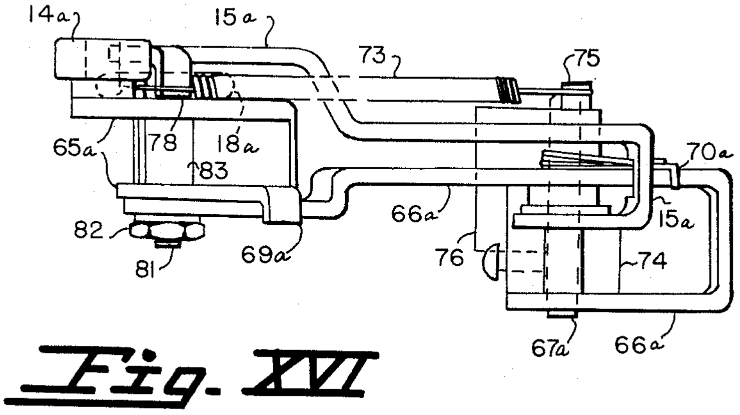
Fig. XVI
INVENTOR.
LAWRENCE S. WILLIAMS
BY
Marshall, Marshall & Yeasting
ATTORNEYS

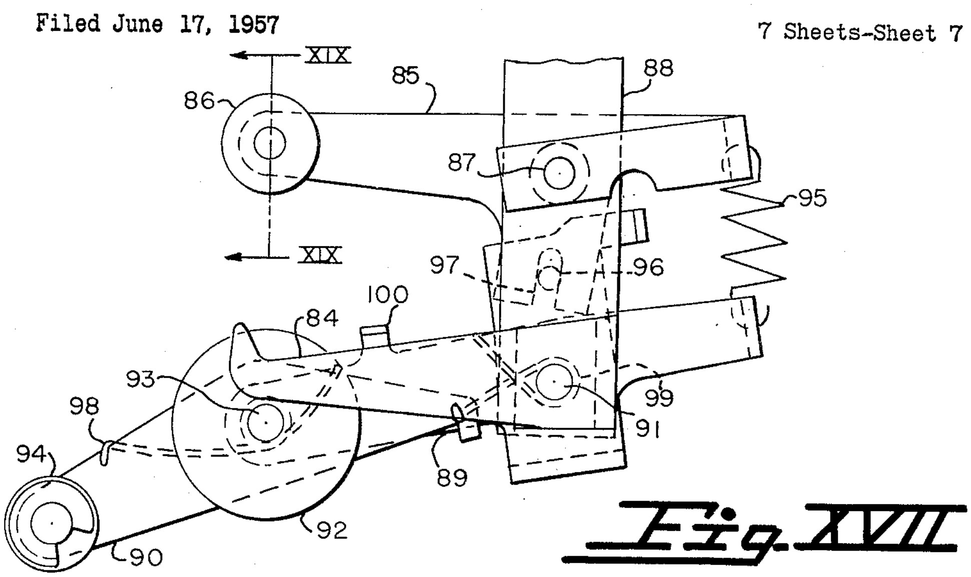
Fig. XVII
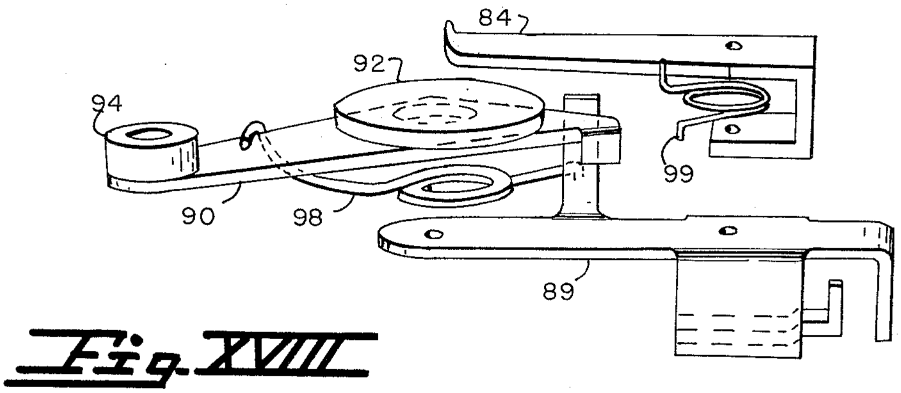
Fig. XVIII
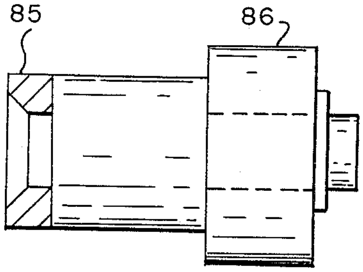
Fig. XIX
INVENTOR.
LAWRENCE S. WILLIAMS
BY
Marshall, Marshall & Yeasting
ATTORNEYS United States Patent Office 3,052,404
Patented Sept. 4, 1962

3,052,404
CHART READING MECHANISM

Lawrence S. Williams, Toledo, Ohio, assignor, by mesne assignments, to Toledo Scale Corporation, Toledo, Ohio, a corporation of Ohio Filed June 17, 1957, Ser. No. 665,952
4 Claims. (Cl. 235—1)

This invention relates to mechanical chart reading devices for use in connection with condition responsive instruments or mechanisms to sense the position of the condition responsive member and convert such information as received therefrom into a form suitable for operating indicating or recording devices.

As industrial processes and inventory control using condition responsive instruments become more and more exact there is a need for a corresponding increase in the accuracy of reading and recording the indications of the instruments. While the reading device constructed according to the invention may be applied to various types of condition responsive mechanism it is, for illustrative purposes only, described in connection with its use in a weighing scale for reading the graduations of a chart that moves according to the weight of a load being weighed and setting mechanism for visual display or printing of weight indications in digital form. The accuracy of a digital indication is limited only by the number of places into which the recording may be resolved. In order to get high accuracy it is necessary to graduate the chart with finely spaced graduations and the difficulty of reading, particularly by mechanical means, is thereby materially increased.

The basic chart reading device with which the invention is concerned is disclosed in copending application Serial No. 616,517 which was filed on October 17, 1956, the present application being a continuation-in-part of such copending application, and includes a permutation disk assembly having a plurality of disks for each order in the result which disks are set by momentary contact with relatively raised and depressed surfaces of a chart and are arranged to be sensed by and control the movement of a member the travel of which corresponds to the digit value of the graduation being sensed. Means are provided for simultaneously urging all of the disks in a direction such that associated feeler pins contact the chart graduations and then immediately retracting the disks without disturbing their relative positions before the final selection is made by a pawl sweeping over the permutation disks.

The present invention provides means for eliminating the possibility of error should a feeler pin slide off a raised portion of a graduation because the chart has stopped halfway between two graduations. Such means includes a centering device, operating ahead of pin movement, to shift the chart from any half graduation position to the next full graduation so that a pin always firmly engages either the crest of a raised portion of a chart graduation or accurately enters a depressed portion.

It is, accordingly, the principal object of this invention to provide chart locating means for a chart reading mechanism whereby such mechanism is reliable and extremely accurate.

Another object of the invention is to provide, in a chart reading mechanism, a chart centering device employing friction means for tangentially urging the chart to a centered reading position.

Still another object of the invention is to provide, in a chart reading mechanism, an automatic chart locating device which is simple to operate, yet is of rugged and low cost construction.

Other objects and advantages will be apparent from the following description in which reference is had to the accompanying drawings.

Preferred forms of the invention are illustrated in the accompanying drawings.

In the drawings:

FIGURE I is an elevation of a weighing scale dial mechanism showing the location of the reading device and a recording device operated thereby as they are mounted on a weighing scale mechanism;

FIGURE II is a fragmentary schematic diagram to illustrate some of the operating principles of the mechanism;

FIGURE III is a diametric view of the permutation members and the drive mechanism therefor to show their cooperation with each other and with the chart;

FIGURE IV is a horizontal section through the lower portion of the assembly of permutation members to show the cooperation between the permutation members and the drive therefor;

FIGURE V is a plan view of one of the permutation members to show its notch pattern;

FIGURE VI is a fragmentary plan view of the notched portion of another permutation member to show a second notch pattern;

FIGURE VII is a front elevation at reduced scale of a weighing scale chart suitable for use with the permutation reading device;

FIGURE VIII is an enlarged fragment of the graduated portion of the weighing scale chart illustrated in FIGURE VII;

FIGURE IX is a section at enlarged scale taken substantially along the line IX—IX of FIGURE VIII to illustrate the shape of the individual chart graduations;

FIGURE X is a section at enlarged scale taken along the line X—X of FIGURE VIII to show the shape of locating notches employed to locate the chart prior to taking a reading;

FIGURE XI is a table showing the permutation code used for each of the graduations of the chart;

FIGURE XII is an exploded view of locating mechanism employed to center the chart graduations prior to taking a reading so as to avoid any possibility of selector pins of the permutation members failing to properly engage the chart graduations;

FIGURE XIII is a plan view of the locating device;

FIGURE XIV is a vertical section along the line XIV—XIV of FIGURE XIII;

FIGURE XV is a plan view of a modified locating device;

FIGURE XVI is an elevational view of the locating device which is shown in FIGURE XV;

FIGURE XVII is a plan view of another modified locating device;

FIGURE XVIII is an exploded diametric view of the principal parts included in the locating device which is illustrated in FIGURE XVII; and FIGURE XIX is a fragmentary elevational view taken along the line XIX—XIX of FIGURE XVII.

These specific figures and the accompanying description are intended merely to illustrate the invention and not to impose limitations on its scope.

For the purpose of illustration, the chart reading device is shown in connection with an ordinary dial type weighing scale. Such a scale comprises a dial housing 1 that contains automatic load counterbalancing and indicating mechanism which may include a chart 2 that is rotated through increments of angle that are proportional to increments of weight applied to the scale. The chart housing 1 is mounted on the top of a scale colum 3 of which only the top portion is shown in FIGURE I.

The chart reading mechanism is contained within a housing 4 attached to the dial housing 1 and is connected through a conduit 5 to a printer or other utilization device 6 which is to be operated according to the scale readings. The chart 2 has on its face a series of graduations 7 that are visible through a magnifying lens 8 to provide visual indications of the load on the scale. The face of the chart 2 is also provided with molded graduations or indicia 9 consisting of relatively raised and depressed surfaces, as shown in greater detail in FIGURES VIII, IX and X, constituting the indicia that are sensed by the reading device contained within the housing 4.

FIGURE II shows in schematic form one of each of the essential elements of the reading device while FIGURE III shows a complete assembly of the sensing and selecting portions of the reading device. Referring first to FIGURE II, a reading of the chart 2 is taken by first advancing a series of sensing pins 10, one of which is shown, by spring-urged rotation of permutation disks 11 to positions at which they are arrested by engagement of the sensing pins 10 with the indicia 9 of the chart 2. Prior to the engagement of the sensing pins 10 with the indicia 9, a cam 12 forming part of a drive member 13, through engagement with a roller 14, drives a resiliently mounted finger 15 toward the chart until its tip 16 engages a row of raised teeth 17 and comes to rest either between adjacent teeth or on the crest of a tooth. Continued motion of the cam follower 14 turns a rubber tired wheel 18 in a direction tending to move the chart 2 so that the tip of the finger 16, if it had lodged on a crest of a tooth 17, is permitted to enter the space between two of the teeth and thus locate the chart 2. If the tip 16 were already engaged in a space between two of the teeth 17 the wheel slips leaving the chart 2 in position with the corresponding graduation centered in the path of the sensing pins 10. Thus, the pins 10 either enter squarely into the spaces between indicia 9 or onto the crests depending upon the coding of the indicia for that particular graduation.

After the permutation disks 11 are retracted, without disturbing their relative positions as determined by the engagement of the sensing pins 10 with the chart 2, search pawls 20, one for each decade, carried on pawl arms 21 and each cooperating with four of the permutation disks 11 search notches 22 in the peripheries of the permutation disks 11. As each pawl finds aligned notches it its set of four permutation disks 11 it stops the pawl carrier in a position corresponding to the particular graduation of the chart being sensed. The stopped pawl carriers, through their connections through cables 23, position a reading device or indicating device according to the sensed graduation.

The movement of the drive member 13 is produced and controlled by a connecting rod 24 and crank 25 driven by a motor 26 equipped with controls to cause it to drive the crank 25 through one revolution for each start signal.

The sequence of steps in thus taking a reading from the chart 2 is to energize the motor such that it turns the crank 25 and thus oscillates the drive member 13. This oscillation first drives the cam follower 14 and finger 15 toward the chart to locate it with a graduation accurately in line with the sensing pins 10. During the oscillation of the drive member 13 the permutation disks 11, four for each decade, are driven so that their respective pins 10 engage the chart and then are retracted without disturbing their relative positions with respect to each other to a locking position at which they are held while the searching pawls 20, one for each group of four permutation disks or one for each decade, search the peripheries of the permutation disks 11 for the aligned notches. Upon finding the aligned notches the pawls stop the respective pawl carriers 21 in proper indicating positions.

The whole combination or assembly of permutation disks and drive members is shown in greater detail in FIGURE III. The complete stack up of permutation disks 11 for a four place number includes sixteen of the permutation disks 11, four pawl carriers 21, and enough spacers 27 to separate each of the permutation disks 11 from its neighbor or from a pawl carrier 21 as the case may be. Thus, sixteen permutation disks 11 and four pawl carriers 21 plus an extra spacer at the top of the stack requires a total of twenty-one spacers 27. Each of the spacers is provided with bifurcated ears 28 and 29 adapted to slip into notches in support rods of a frame with the rods holding the spacers in alignment and in spaced relation. Each of the spacers also has an inwardly directed notch 30 on the side facing the chart that terminates in a narrow slot 31 adapted to fit into a corresponding groove cut in an axle 32 on which the permutation disks 11 and pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The sensing pins 10 each has a pointed end 33 that is sharp enough to enter the spaces between alternate graduations and yet blunt enough to avoid cutting the chart material and has its other end curled into a circular loop 34 that is a close sliding fit in a hole cut in the connected permutation disk 11 so that the pin moves in the manner of a flat ball and socket joint. This particular construction keeps the thickness of the permutation disk and pin a minimum so that it may fit between closely spaced adjacent spacers 27.

The permutation disks 11 are continually urged in a direction tending to drive the sensing pins 10 against the chart by spring teeth 35 of a comb spring 36 that is carried on a common pawl bail 37. The ends of the spring teeth 35 engage notches 38 in the permutation disks. Movement of the permutation disks 11 under the influence of the springs 35 is limited by a common pawl 40 that is carried in the bail 37 and arranged to selectively engage either of two notches 41 or 42 of each permutation disk 11 and lock it in position when the pawl engages hook-like portions 43 (FIGURE IV) of the bifurcated ears 29 as the bail 37 is urged counterclockwise, as seen in FIGURES III and IV, by a return spring 44 attached to its lower end. The common pawl 40 is held seated in pivot notches 45 of the bail 37 by a plurality of small springs 46 forming part of the comb spring 36 and attached to the bail 37. The pawl 40 is urged into engagement with the notches 41 or 42 by a light spring 47 also attached to the bail 37.

In operation, as the drive member 13 is swept clockwise as seen in FIGURES III or IV it collects the pawl carriers 21 from their previous positions and finally engages an upwardly directed stud 48 carried in an upper arm 49 of the bail 37 so as to drive the bail clockwise through a small distance against the tension of the return spring 44. During the initial movement of the bail 37 it and the permutation disks 11 move as a unit since the disks are held between the spring teeth 35 engaging the notches 38 and the pawl 40 engaging the notches 41 or 42. As the sensing pins 10 engage the chart 2 and drive it against a backup roller 50 the motion of the permutation disks 11 is arrested. The spring teeth 35 yield as the bail 37 continues and the pawl 40 leaves the notches 41 or 42 and slides part way along the smooth periphery of the permutation disks 11 between the notches 41 and 38. This motion is just far enough to make sure that the common pawl 40 is out of the notches. On the return motion of the drive member 13, the spring 44 pulls the common pawl bail 37 counterclockwise so that the common pawl 40 may enter the aligned ones of the notches 41 or 42 in each of the permutation disks according to whether the disk had been advanced by its pin finding a low spot in the chart or whether it had been arrested in the first position with the pin on the crest of a graduation. The continued motion with the common pawl 40 engaged in the permutation disks drives the disks in retracting motion until the common pawl 40 seats behind the hook-like portions 43 of the spacer ears 29. At this point the motion of the common pawl bail 37 is arrested and the permutation disks 11 are all locked in position.

Continuing motion of the drive member 13 allows the pawl carriers 21 to follow as urged by their drive spring 52, one of which is shown in FIGURE IV connected to its cable 23. The pawl carriers 21 move until their pawls 20 find aligned notches in a particular combination of permutation disks with which they cooperate. It is to be noted that the position of the aligned notch may vary according to the relative positions of the group of disks cooperating with each pawl.

The sensing pins 10 adjacent the chart 2 are guided in slots 54 of a guide plate 55 that is attached to a frame support 56 that serves as the spacing support for the bifurcated ears 28 of the spacers 27. The slots 54 are just wide enough to admit the pins and, thus, accurately guide them closely adjacent the chart 2. As indicated in FIGURE IV, the guide plate 55 is adjustable relative to the frame support rod 56 and is controlled by an adjusting screw 57 that works in opposition to the common pawl bail return spring 44.

The return springs 52 may be the springs in the printer mechanism to maintain tension on the cables 23 or if a commutator, not shown in the drawings, be attached to the pawl carriers 21 the springs 52 may be returned to the frame mechanism merely to apply tension to the cable 23 and do no other useful work. If a printer, as indicated in FIGURE I, is enclosed in the housing 6 the cables 23 are run through the conduit 5 from the selector mechanism in the housing 4.

Referring to FIGURE IV, each cable 23 is passed over an arcuate surface or periphery 58 of its pawl carrier 21 and its end is anchored in a hole 59 drilled through the pawl carrier. The spacers 27 hold the cable 23 from slipping off sideways. The radius of the arcuate surface 58 with respect to the axle 32 on which the pawl carrier is journaled is selected according to the desired travel of the cable 23 for each increment of indication and the spacing of the notches 22 which determine the angular travel of the pawl carrier.

The permutation disks 11 are made with either of two notch patterns and the selector pawls 20 are arranged with one of its teeth advanced two notch spaces ahead of the other tooth. By thus varying the spacing of the pawl teeth and providing the two different patterns for the selector disks it is possible to secure at least eleven different combinations to provide different stopping points for the pawl 20. FIGURES V and VI show the two notch combinations for the permutation disks 11. In the type shown in FIGURE V the notched periphery is divided into twenty-three equal spaces with notches appearing in the first, third, fourth, sixth, ninth, tenth, twelfth, fifteenth, seventeenth, eighteenth, twentieth, and twenty-third spaces counting from left to right. Likewise the permutation pattern shown in FIGURE VI has notches appearing in the first, second, fifth, sixth, ninth, tenth, thirteenth, fourteenth, seventeenth, nineteenth, twenty-first, and twenty-third spaces. These particular notch combinations used in pairs with the offset pawl teeth operate according to the code set forth in FIGURE XI. This code is used in determining the location of the raised and depressed indicia for each of the graduations on the chart 2 to be sensed.

As shown in FIGURE VII, the chart 2 is an annular member carried on a spider 60 and having rows of graduations 61 on its marginal area. The graduations or indicia are preferably molded in the face of the chart in the same manner as phonograph records are made with a plastic layer mounted on a metallic backing plate and the graduations being formed in the plastic layer. The arrangement of graduations for a first fragment of the chart is illustrated in FIGURE VIII. This fragment, starting with the zero indicia of the chart, shows only those graduations in the units or lowest order decade and the row of teeth 17 for locating the chart. The teeth 17 along the marginal area of the chart cooperate with the locating finger 15 and have cross sections as shown in FIGURE X wherein each of the teeth is shown substantially as a conventional rack tooth. The tip 16 of the locating finger 15 is formed as a mating tooth so as to seat firmly in the spaces between the teeth 17.

The indicia 9 with which the sensing pins 10 cooperate are of generally similar shape except for being formed of heavier section inasmuch as the locating pins do not have to fit into the spaces between teeth that are located on adjacent graduations. The chart section shown in FIGURE VIII, as was mentioned, includes that portion starting at the zero graduation which is shown at the right-hand edge. Inasmuch as there are no significant figures to the left of the zero when indicating the zero graduation it is desirable that the indicator show or the printer print a blank at this position. Therefore, the first graduation carries only the single raised portion in the bottom row or D row which, according to the chart shown in FIGURE XI, gives a blank for the output indication. The permutation disk combination for this graduation causes the aligned notch to appear at the end of the travel of the pawls 20 or at the last possible position at which an aligned notch may be formed. If an error is made such that the pawl does not find the aligned notch it overtravels and the printer indicates such overtravel by printing some distinctive symbol in place of a digit. The next graduation, a one, is indicated or denoted by a single raised indicia in the A row; likewise two is indicated by a single indicia in the C row; and the others follow according to the chart. It should be noted that the raised indicia of the chart cause the corresponding permutation disk 11 to be advanced counterclockwise one space as seen in FIGURES III or IV.

Other chart combinations may be employed besides the particular code indicated. However, this particular code was selected in order that the number of different parts could be reduced. Thus, with the selected code two each of the permutation disks 11, shown in FIGURES V and VI, may be employed in each decade in combination with the offset pawl 20. If the offset pawl were not employed then each of the four permutation disks cooperating for each decade would have to have its own combination of notches which would make four different parts to be stocked instead of two.

The chart locating mechanism is illustrated in greater detail in FIGURES XII, XIII and XIV. Referring to FIGURE XII, the cam follower 14 is mounted on the end of a forearm 65 that also carries, as a rigid part thereof, at its elbow end the drive wheel 18 that engages the chart to urge it forward so as to move any tooth 17 falling below the finger tip 16 out of the way and allow the tip 16 of the finger 15 to fall into the space between adjacent teeth 17. The arm 65 is pivotally connected through an elbow joint at the axis of the wheel 18 to a second arm 66 which in turn is pivoted on and, by a spring not shown, is continually urged clockwise about a pin 67 fixed in the framework of the scale. A spring 68 at the joint or elbow at the wheel 18 urges the forearm 65 clockwise with respect to the second arm 66 so that the wheel bears against the chart 2 before the elbow joint starts to turn. The spring urged movement of the forearm 65 relative to the second arm 66 is limited by a down turned ear 69 on the tail end of the forearm 65 that engages the front surface of the lower arm 66. Normally, the spring 68 rotates the forearm 65 to maintain the ear in engagement with the lower arm. However, when the mechanism is pushed toward the chart by the cam pushing on the cam roller 14 the lateral motion of the wheel 18 is arrested and the cam force against the cam follower 14 then rotates the arm 65 around its connection with the lower arm 66 thus producing the relative rotation of the wheel 18.

The finger 15 with its tip 16 is carried on the pin 67 and is urged toward the chart by a spring 70 acting between the lower arm 66 and the finger 15. The forward movement of the finger 15 is limited by a stop 71 erected from the rear portion of the lower arm 66 in position to engage the chart side of the finger 15.

FIGURE XIV is a section taken through the elbow joint between the arms 65 and 66 and shows a rubber tire 72 mounted on the wheel 18 so as to increase the tractive effort of the wheel on the chart.

In the operation of this mechanism the spring 68 is made stiff enough so that when the wheel 18 engages the chart it pushes the chart back against the backup roller 50 before the spring 68 yields and permits the arm 65 to turn relative to the arm 66. This insures that sufficient force is exerted against the chart to cause it to move even though the tip 16 of the finger 15 should be partially caught on the corner of the crest of a tooth. It is necessary that sufficient force be exerted at this time so that the tip of the finger 15 will slide across the crest of a tooth 17 and firmly engage in the valley against the side of the next tooth 17.

The chart locating mechanism includes a total of three springs, i.e., springs 68, 70 and the one, not shown, which continually urges arm 66 clockwise about pin 67. Such springs each require rather sensitive differential forces for good results. The number of the springs, however, can be reduced from three to two by using the device which is illustrated in FIGURES XV and XVI, the modified device having the advantage that accuracy of differential forces need not be considered in mass production of the device.

Referring to FIGURES XV and XVI, the modified chart locating mechanism is alike in principle to the mechanism hereinbefore described and shown in FIGURES XII—XIV; however, it is shown in reverse orientation so that it can be driven by the motor 26, crank 25, connecting rod 24, and drive member 13 that are located to the left of the chart 2 instead of to the right of the chart 2 as illustrated in FIGURE II, i.e., the locating mechanism shown in FIGURES XII—XIV is driven by a right hand drive and the locating mechanism shown in FIGURES XV and XVI is driven by a left hand drive. Similar reference numerals in FIGURES XII—XIV and in FIGURES XV and XVI refer to parts which are alike in structure and in function.

The cam follower 14*a* is mounted on the end of a forearm 65*a* that also carries, as a rigid part thereof, at its elbow end a rubber tired drive wheel 18*a* that engages the chart 2 to urge it forward so as to move any chart tooth 17 falling below a finger tip 16*a* on a finger 15*a* out of the way permitting the tip 16*a* to fall into the space between adjacent chart teeth 17. The arm 65*a* is pivotally connected through an elbow joint at the axis of the wheel 18*a* to a second arm 66*a* which in turn is pivoted on and, by a spring 73, is continually urged counterclockwise about a pin 67*a* fixed in a stationary base 74 carried by the framework of the scale. The spring 73, which extends between a fixed point 75 on an anchor bracket 76 that is attached to the base 74 and a point 77 on the arm 65*a*, urges the forearm 65*a* counterclockwise with respect to the second arm 66*a* so that the wheel 18*a* bears against the chart 2 before the elbow joint starts to turn. The spring urged movement of the forearm 65*a* relative to the second arm 66*a* is limited by a down turned ear 69*a* on the tail end of the forearm 65*a* that engages the front surface of the lower arm 66*a*. Normally, the spring 73 rotates the forearm 65*a* counterclockwise to maintain the ear 69*a* in engagement with the lower arm 66*a*. However, when the centering device is pushed toward the chart by the cam pushing on the cam roller 14*a*, the lateral motion of the wheel 18*a* is arrested by the chart 2 and the cam force against the cam follower 14*a* then rotates the arm 65*a* around its elbow connection with the lower arm 66*a* thus producing the relative rotation of the wheel 18*a*.

The finger 15*a* with its tip 16*a* also is carried on the pin 67*a* and is urged toward the chart by a spring 70*a* acting between the lower arm 66*a* and the finger 15*a*. The forward movement of the finger 15*a* is limited by a down turned ear 78 on the finger 15*a* in position to engage the wheel 18*a*. Rearward movement of the finger 15*a* is limited by an end 79 of the spring 70*a* being pushed against face 80 of the lower arm 66*a*. The pin 67*a*, as best shown in FIGURE XVI, functions to pivotally support both the finger 15*a* and the lower arm 66*a*, the finger 15*a* and the arm 66*a* having flat-bottomed, U-shaped ends pivoted on the pin 67*a*. Similarly, the forearm 65*a* is pivotally connected through the elbow joint at the axis of the wheel 18*a* to the second arm 66*a* at a flat-bottomed, U-shaped end on the forearm, such elbow joint including a bolt 81 and a nut 82 attached to the lower arm 66*a* with a spacer 83 keeping the arms of the U-shaped end of the forearm apart, the forearm being rockable about the axis of the bolt 81.

The spring 73 is made stiff enough so that when the wheel 18*a* engages the chart it pushes the chart back against the backup roller 50 before the spring 73 yields appreciably and permits the arm 65*a* to turn relative to the arm 66*a*. This insures that sufficient force is exerted against the chart to cause it to move even though the tip 16*a* of the finger 15*a* should be partially caught on the corner of the crest of a chart tooth 17.

In operation, pressure of the cam 12 against the cam follower 14*a* moves the forearm 65*a* toward the chart. The forearm 65*a* carries with it the wheel 18*a* which is fixed to the forearm, the finger 15*a* which has its down turned ear 78 spring urged against the wheel 18*a*, and the lower arm 66*a* which has its front surface in contact with the spring urged, down turned ear 69*a* on the forearm 65*a*. The finger tip 16*a* on the finger 15*a* contacts the chart first, the finger 15*a* then pivoting counterclockwise about the axis of the pin 67*a* in opposition to the spring 70*a* until the end 79 of the spring 70*a* contacts the abutment face 80 of the lower arm 66*a*. Movement of the finger 15*a* relative to the lower arm 66*a* is quite limited. Since the fixed point 75 at the end of the spring 73 is close to the pin 67*a*, the initial movement of the locating device toward the chart may be accomplished with little force, the spring 73 being stretched only slightly during the cycle before the wheel 18*a* contacts the chart.

Next, the rubber tired wheel 18*a* contacts the chart and its lateral motion soon is arrested by the chart 2 which is backed up by the backup roller 50. The cam force then rotates the arm 65*a* around its elbow connection with the lower arm 66*a* producing the relative rotation of the wheel 18*a*, the spring 73 at this point yielding appreciably. Rotation of the wheel 18*a* moves the chart 2 so as to move any chart tooth 17 falling below the finger tip 16*a* on the finger 15*a* out of the way permitting the spring urged tip 16*a* to fall into the space between adjacent chart teeth 17. Once the tip 16*a* falls into the space between adjacent chart teeth 17, the chart can be moved no further about its axis of rotation by the wheel 18*a* and the wheel 18*a* merely slips on the surface of the chart until it is withdrawn, it being withdrawn in a very short time, since the chart graduation sensing cycle of the reading device is of short duration. Of course, it may happen that the chart is so located initially by the condition responsive mechanism that the finger tip 16*a* is moved directly into the space between adjacent chart teeth 17. In such a case, the chart cannot be moved about its axis of rotation by the wheel 18*a* and the wheel merely slips on the surface of the chart. However, in any case, the wheel 18*a* functions to push the resilient chart back against the backup roller 50 in position to be sensed by the sensing pins 10.

The chart locating mechanism operates ahead of the sensing pin 10 movement to shift the chart 2 from any half graduation position to the next full graduation so that a sensing pin 10 always firmly engages either the crest of a raised portion of a chart graduation or accurately enters a depressed portion. Upon withdrawal of the cam 12, the cam roller 14*a* follows along under the urging of the spring 73, the spring 73, thus, functioning both as a return spring for the roller 14*a* and its associated parts and also as a resilient means which gives way to allow the elbow connection to work at the appropriate time. The chart locating mechanism may be summarized in principle as a device employing friction means, i.e., the rubber tired wheel 18*a*, for tangentially urging the chart, after it has been positioned approximately by condition responsive mechanism, to a centered reading position. The chart locating mechanism shown in FIGURES XII—XIV and the modified structure shown in FIGURES XV and XVI employ the same such friction means, the friction means eliminating the possibility of error should a sensing pin 10 slide off a raised portion of a graduation because the chart has stopped halfway between two graduations.

Another modification of the chart locating mechanism is illustrated in FIGURES XVII—XIX; it is exactly like the one described and shown in detail in FIGURES XV to XVIII in the hereinbefore referred to copending parent application Serial No. 616,517. The locating device includes a finger 84 that is adapted to engage the spaces between the teeth 17 in the marginal area of the chart 2. The finger 84 is part of a scissors arrangement comprising a backup arm 85 carrying a roller 86 journaled on an axis 87 forming part of a bracket 88 attached to the frame of the scale. When the modified device is used, the backup roller 50 (FIGURE IV) is replaced by its counterpart roller 86. The finger 84 is part of an articulated assembly that also includes a front scissors arm 89, and a roller arm 90. The articulated assembly is primarily journaled on an axle or stud 91 and the entire centering assembly is positioned relative to the chart 2 so that the marginal area of the chart may be caught between a rubber tired roller 92 carried on the roller arm 90 and the backup roller 86 carried on the arm 85 as these members are brought together. The rubber tired roller 92 has the same function as the rubber tired wheels 18 and 18*a* hereinbefore described. The roller arm 90 is journaled on a short stud 93 forming part of the front scissors arm 90. Also, a cam follower roller 94 is carried on the end of the roller arm 90 and is adapted to engage the edge of the cam 12 (FIGURE II). A spring 95 normally holds the scissors arrangement in open position as is illustrated in FIGURE XVII. Furthermore, the front scissors arm 89 drives in equal amounts, the back scissors arm or backup arm 85 by means of a pin 96 set in an L-shaped extension of the front scissors arm 89 in position to engage a slot 97 in the backup arm 85. Suitable ears are turned up from the various members to limit the pivotal or rotational movement of each with respect to the member on which it is supported.

In addition to the spring 95, a spring 98 is coiled about the stud 93 with one end engaging the roller arm 90 and the other engaging the front scissors arm 89 with the tension in the spring urging the roller arm 90 counterclockwise as shown in FIGURE XVII. The spring 98 is made relatively stiff so that it can overcome the tension in the spring 95 and close the scissors before there is any relative movement between the roller arm 90 and the front scissors arm 89.

Another spring 99 coiled about the stud 91 and engaging the finger 84 urges the finger toward the chart at all times. The travel of the finger is limited by an ear 100 of the front scissors arm 89 at a point where the tip of the finger 84 extends a short distance beyond the periphery of the rubber tired roller 92.

When a reading of the chart is to be made and the motor 26 is energized, the first portion of the travel of the drive member 13, cam 12 and the roller 94 drives the roller arm 90 and the front scissors arm 89 toward the chart without bending the joint at the stud 93. The backup roller 86 on the end of the arm 85 approaches the chart from behind to prevent further deflection of the chart away from the finger 84 and rubber tired roller 92. As the arm is advanced further, the leading tip of the finger 84 engages the teeth 17 of the chart 2 and either enters the space between the pair of teeth or rests on the crest of a tooth. The pressure exerted at this point deflects the finger 84 back against the tension of the spring 99 permitting the rubber tired roller 92 to engage the margin of the chart. Since the chart is backed up by the roller 86 it cannot deflect back away from the rubber tired roller 92 but rather is held there and as the cam 12 continues to drive the cam roller 94 forward the arm 90 turns on the stud 93 so that the rubber tired roller 92 tends to pull the chart toward the right, as seen in FIGURE XVII, a small distance. The friction drive between the roller 92 and the chart is not enough to dislodge the tip of the finger 84 if it were engaged between two teeth but is sufficient to move the chart so that the tip of the finger 84 slides off the crest of a tooth and into the space between adjacent teeth 17. Thus, regardless of whether the chart is stopped with a tooth 17 or a space between the teeth 17 opposite the tip of the finger 84 it will eventually be positioned with the tip of the finger 84 in the space between two of the teeth 17.

Various modifications in any one of the three species of the chart locating device may be made without losing the advantages of the structures disclosed or departing from the scope of the invention.

Having described the invention, I claim:

1. In a mechanical chart reading device having a rotatably mounted teeth-bearing chart positionable by condition responsive mechanism, and means for sensing the chart, chart aligning and locking means comprising, in combination, movably mounted finger means movable to engage between the teeth on the chart, movably mounted roller means movable to engage and frictionally rotate the chart, and means for moving the finger means and the roller means into contact with the chart and for thereafter rotating said roller means before the sensing means senses the chart, the finger means contacting the chart before the roller means contacts the chart and either coming to rest on the crest of a tooth or coming to rest between two teeth, the roller means urging the chart about its axis of rotation thereby moving the chart about such axis when the finger means is on the crest of a tooth and slipping on the chart when the finger means is between two teeth, whereby the finger means finally always enters between two teeth locking the chart in a centered reading position to be sensed by the sensing means.

2. In a mechanical chart reading device having a rotatable chart that has a series of raised final locating surfaces near the margin of the chart and that is positionable by condition responsive mechanism and sensing means for sensing the chart, chart aligning and locking means including a finger movable to engage between the chart locating surfaces, a roller movable to engage and frictionally rotate the chart, and means for moving the finger and the roller into contact with the chart and for thereafter rotating said roller before the sensing means senses the chart, the roller urging the chart about its axis of rotation and thereby moving the chart about such axis whenever the finger is on one of the chart locating surfaces and slipping on the chart whenever the finger is between two of the chart locating surfaces, whereby the finger always enters between two of the chart locating surfaces locking the chart in a centered reading position.

3. In a mechanical chart reading device having a rotatable teeth-bearing chart positionable by condition responsive mechanism and means for sensing the chart, chart aligning and locking means comprising a pivotally mounted finger movable to engage between the teeth on the chart, pivotally mounted friction means movable to engage and rotate the chart, and means for pivoting the finger and the friction means into contact with the chart and for thereafter rotating the friction means before the sensing means senses the chart, the finger contacting the chart before the friction means contacts the chart, the friction means urging the chart about its axis of rotation thereby moving the chart about such axis when the finger is on the crest of a tooth and slipping on the chart when the finger is between two teeth, whereby the finger finally always enters between two teeth locking the chart in a centered reading position to be sensed by the sensing means.

4. In a chart reading device having a rotatable chart with a series of locating teeth, a centering device for moving the chart to a final reading position comprising, in combination, an elbow mounted to pivot about a first axis and including a first arm, a second arm and a pivotal joint connecting the arms, the end of the first arm remote from the joint being resiliently urged about the joint away from the chart, a finger positionable to contact the teeth mounted to pivot about said axis located at the end of said second arm remote from said joint, the finger being movable relative to the elbow, a spring for urging the finger relative to said elbow toward the chart and a wheel carried by the first arm as a rigid part thereof, the axis of the wheel being at the elbow joint, and means cooperating with the first arm for moving the centering device about the first axis toward the chart, whereby first the finger contacts the chart sometimes coming to rest on the crest of a tooth and sometimes coming to rest between two teeth and is moved back relative to the wheel by the chart in opposition to the spring, the wheel contacts the chart, the first arm moves relative to the second arm and the wheel urges the chart about its axis of rotation thereby moving the chart about such axis when the finger is on the crest of a tooth and slipping on the chart when the finger is between two teeth, whereby the finger finally always enters between two teeth locking the chart in a centered reading position.

References Cited in the file of this patent

UNITED STATES PATENTS

| | | |
|---|---|---|
| 468,945 | Pfeffer | Feb. 16, 1892 |
| 541,373 | Michaud | June 18, 1895 |
| 597,068 | Pottin | Jan. 11, 1898 |
| 1,284,188 | Goss | Nov. 5, 1918 |
| 1,338,282 | Boyer | Apr. 27, 1920 |
| 1,672,141 | Ygger | June 5, 1928 |
| 1,688,539 | Fischer | Oct. 23, 1928 |
| 1,896,850 | Perry | Feb. 7, 1933 |
| 1,988,072 | Depenbrock | Jan. 15, 1935 |
| 2,040,072 | Brendel | May 12, 1936 |
| 2,149,478 | Triner | Mar. 7, 1939 |
| 2,792,275 | Drillick | May 14, 1957 |